United States Patent [19]
Wells

[11] Patent Number: 5,421,415
[45] Date of Patent: Jun. 6, 1995

[54] HORSESHOE

[76] Inventor: Wayne Wells, 3 Heaton La., Wappinger Falls, N.Y. 12590

[21] Appl. No.: 42,808

[22] Filed: Apr. 5, 1993

[51] Int. Cl.6 .......................... A01L 1/04; A01L 7/04
[52] U.S. Cl. .......................................... 168/4; 168/24; 168/32; 168/35
[58] Field of Search .................. 168/4, 24, 31, 32, 35, 168/36, 40, 42, 43

[56] References Cited

U.S. PATENT DOCUMENTS

| | | | |
|---|---|---|---|
| 504,943 | 9/1893 | Robinson | 168/42 |
| 804,959 | 11/1905 | Kostenbader | 168/36 |
| 893,481 | 7/1908 | Gordon | 168/24 |
| 984,385 | 2/1911 | Miller | 168/40 |
| 1,072,006 | 9/1913 | Hershberger | 168/43 |
| 1,378,942 | 5/1921 | Farry | 168/31 |
| 2,197,166 | 4/1940 | Wheeler et al. | 168/29 X |

*Primary Examiner*—Robert P. Swiatek

[57] ABSTRACT

A horseshoe stock piece and various complementary pieces provide variety of custom features for horseshoes such as heel calk trailers, trailer calks, calk horseshoes and patent shoes. The stock piece is a horseshoe structure with conventional top or hoof surface, a bottom or ground surface, inner and outer faces, fullering on the ground side, and nail holes within the fullering. The heel end of each arm of the stock piece has a flat, rectangular recess formed in the ground surface face which is from 40%–60% of the depth or thickness of the shoe stock. A transverse groove is formed in the central portion of the recess. The groove has walls which are perpendicular to the surface of the groove and there is a threaded aperture formed in the base of the groove. The foregoing is dimensioned to receive a complementary piece secured in the recess. The complementary piece has a transverse extension or lug extending into the groove. A fastener passes through the complementary piece into the threaded aperture in the shoe structure. The structure allows a farrier to fabricate without forging an extensive variety of special shoe structures not otherwise readily available.

6 Claims, 4 Drawing Sheets

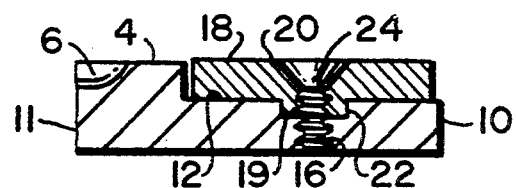
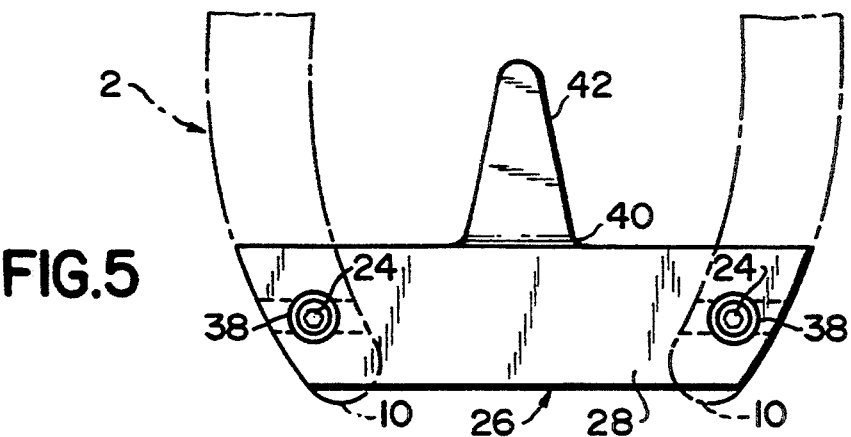
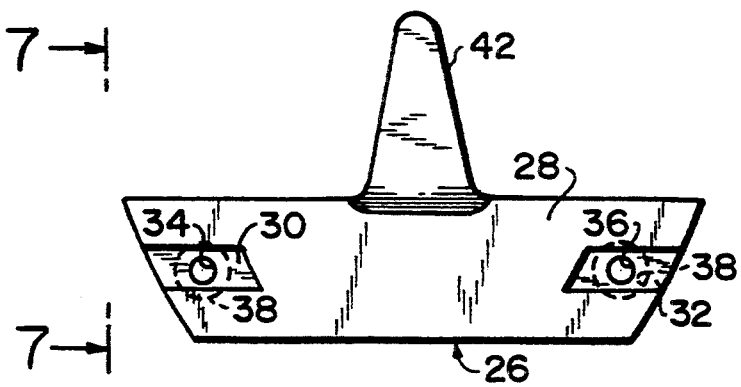
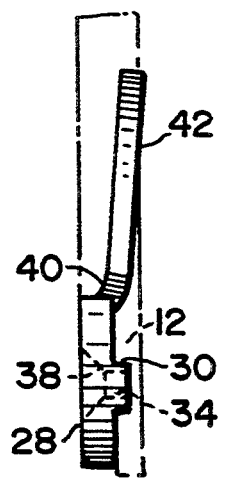

HORSESHOE

BACKGROUND OF THE INVENTION

1. Field of the Invention

The present invention is concerned with the field of farrier, that is the art and science of horseshoeing.

The present invention is more particularly concerned with providing a basic horseshoe structure that is readily adaptable to a multitude of requirements of customized shoe structures and to provide such structures without the necessity of carrying a large stock of parts or possession of great skill with a forge.

According to this invention, it is now possible to provide such items cheaply and rapidly. They may be fabricated with a minimum level of skill on the part of the farrier, in a short period of time, without a forge.

The farrier trade is one which in the past generally required a high degree of skill to custom-form shoes with use of hot forge in cases where particular modifications such as heel calks, trailers, trailers with heel calks, heart bar shoes, egg bar shoes, bar shoes and various other modifications required for running or working conditions or for correcting pathological conditions in the horse's hoof or legs or to obtain gait effects and the like.

In the past, it something other than a plain shoe was required, it necessitated that a farrier carry a large stock of different types of shoes with it's attending inventory costs, transportation costs, economics of space and the like.

If the farrier does not possess a high degree of skill in working the forge, an excess amount of time was required.

There has been a great tendency recently because of economics, to use more stock shoes because of the general decrease in the level of skill of farriers. The practice of cold shoeing horses has vastly expanded in recent years because of these factors.

The present invention reduces the necessary inventory of the farrier by more than fifty percent.

It is an object of the present invention to provide a low cost and convenient method of being able to provide custom features in horseshoes which may be formulated from a limited number of stock items and generally constructed without resort to hot shoeing techniques. These ends are achieved by providing a horseshoe stock piece in the usual number of sizes. The stock piece, however, is readily adapted to form standard shoes, shoes with heel calks, egg bar shoes, heart bar shoes and many other types of shoes to meet special running conditions and therapeutic needs of the animal involved.

It generally eliminates the need for a high degree of forge skill in building customized structures. The present invention is able to provide a method of forming such shoes, and applying the shoes rapidly at low cost without a high degree of skill being necessary and also drastically reducing forge time. It permits the immediate application in emergency situation e.g. instances of bowed or severed tendons where an egg bar or similar shoe may be required to reduce further stress and or the risk of further injury to the deep flexor tendon.

2. Prior Art

C. Weitman, U.S. Pat. No. 64,604 discloses a horseshoe having calks which may be added without changing the shoe. The calks are in the form of the U-shaped clip. One arm of the U is on the under surface of the shoe, the base of the U on the edge of the shoe, and a shorter arm extending over the top of the shoe. A screw passes through the lower surface arm into a predrilled hole in the shoe in order to secure the calk. In the case of the heel calk, a notch parallel to the longitudinal axes of the swing of the shoe is formed on the top surface of the shoe to seek the upper end of the calk or a shorter arm into a notch of the shoe.

Sparks U.S. Pat. No. 4,386,660, discloses a shoe having a permanent front calk and an elaborate pair of holding members intermediate the shoe for removable securing the second calk position transversely to the longitudinal axis on the forward half of the shoe to improve turf gripping. The second calk does not extend downwardly as much as the front or toe calk. A very complex structure is involved.

Douglas U.S. Pat. No. 1,373,118, discloses detachable calks which are simply secured to the bottom of the shoe by screw fasteners with intermediate padding devices between the calk and the shoe.

In Baldwin & Swenson U.S. Pat. No. 1,269,897, detachable heel and toe calks are shown in which a threaded shank extends from the upper surface of the calk to be received in an appropriately threaded aperture located in the toe or the heel of the shoe. On a plate spaced from the threaded shank of the calk is an aperture in which a bolt is received to be threaded into another aperture in the lower surface of the shoe to prevent the shank from becoming unthreaded. These, in effect, are simply calks which are fastened onto the lower surface of the shoe by a pair of threaded fasteners.

Covington U.S. Pat. No. 1,189,543, discloses a horseshoe having recesses or notches in the sidewall for securing detachable calks, each notch having one or more threaded apertures for receiving a threaded fastening means for securing the detachable calks. Rather elaborate slotted notches are provided in all of the embodiments.

McGann U.S. 817,582, discloses a detachable heel bar calk for horseshoes which is secured by an elaborate threaded and wedge plate arrangement and does not have universal application.

The further patent to McGann, U.S. Pat. No. 817,583, is a related disclosure which includes rubber pads in the arrangement.

Cox U.S. 944,666, discloses detachable heel and toe calks which are secured to the shoe by a threaded shank with a key lock and spaced therefrom in a plate parallel to the lower surface of the shoe is a threaded aperture through which passes a smaller diameter screw stud into a second hole in the shoe.

Kieffer, U.S. 991,211, discloses removable calks which are attached to the shoe by being wedged into transverse undercut grooves in the lower surface of the shoes and held in the grooves by passing through the caulk and a hole in the face of the groove 1, passing through to the rear wall of the shoe and bolted.

Billado U.S. Pat. No. 1,027,804, discloses a shoe having removable calks which are secured to the lower surface of the shoe by threaded bolt means passing through a horizontal flange of the calk into the lower surface of the side which has a threaded aperture(s) matching the threaded bolt. The heel portion of the shoe on the lower surface is provided with a V-shaped groove in which a corresponding lug at the upper end of the heel calk is received to minimize the loosening of the calk.

Engstom & Bloom U.S. Pat. No. 1,075,34, discloses a shoe structure in which integral permanently fixed calks of the heel and toe are undercut on one side thereof to form a groove or recess for carrying a calk plate carrying a removable calk and the underside of the shoe has a threaded aperture to receive a threaded fastener such as a screw which passes through the calk plate into the shoe. The calk plate is retained by the threaded fastener and the undercut groove or recess. None of the disclosures in the foregoing references suggest the unique universally applicable horse shoe structure which applicant has devised.

SUMMARY OF THE INVENTION

The present invention provides a horseshoe stock piece and complementary pieces which are readily adaptable to multiple modifications to provide either standard horseshoe structures or an extensive variety of custom features such as shoes with heel calks, trailers, trailer calks, egg bar shoes, heart bar shoes, bar shoes, patton shoes, etc.

The horseshoe stock piece of the present invention comprises a horseshoe structure having a conventional top or hoof surface, a bottom or ground surface, inner and outer faces, fullering on the ground side of the shoe and nail holes within the fullering. The heel end of each arm of said shoe structure has a generally flat rectangular recess formed in the ground surface face thereof. The recess is generally from 40% to 60% of the depth thickness of said shoe structure and has a transverse groove in the central portion of the recess. The groove has walls, which are generally perpendicular to the base surface of the groove. The recess and groove and threaded aperture are dimensioned to receive a complementary piece secured in said recess. The complementary piece has a transverse extension or lug which extends into said groove. A threaded fastener passes through the complementary piece into the threaded aperture in the shoe and secures the complementary piece aid the shoe structure.

The complementary piece when secured to said stock shoe structure completes the desired horseshoe structure such as a standard shoe, heart bar shoe and the like as will be seen in the illustrative embodiments.

As indicated the objects of the invention are obtained by providing a conventional horseshoe structure with a generally rectangular recess formed in lower face at the end of the heel section of each branch or arm of the shoe, approximately half way through the thickness of the shoe. Transversely of the shoe arm and approximately midway in the length of the recess is a transverse groove with a threaded aperture centrally located in the base thereof. A complementary structure which in the case of forming a completed conventional shoe is a flat piece with a transverse extension or lug formed on the upper surface thereof is placed in the recess and an Allen screw fastener is threaded through them to secure the complementary piece to the shoe structure. The mating faces of the recessed transverse groove and extension or lug prevent lateral movement between the pieces when placed upon the animal.

As seen clearly from the illustrative embodiments which follow, not only may flat complementary pieces be utilized but pieces corresponding to heel calks, trailers, trailers with calks may be substituted for the flat piece. Also, the present invention may be used to form egg bar shoes, bar shoes, heart bar shoes, etc. by adding the appropriate complementary piece or pieces required with complementary extensions or lugs to fit into the groove in the recess in each arm.

The present invention greatly reduces by up to fifty percent the number of stock shoes required to provide various custom shoe forms and eliminates the need for a high degree of forging skill to customize such items at the site of the shoeing operation.

In addition, these shoe forms may be assembled and completely applied to the animal in substantially less time than it previously took highly skilled farriers to prepare and form even one such shoe.

BRIEF DESCRIPTION OF THE ACCOMPANYING DRAWING

In the accompanying drawing which forms part of the specification:

FIG. 4 is a transverse sectional view taken along lines 4—4 of FIG. 3;

FIG. 5 is a partial bottom plan view of a heart bar complementary piece used to form a heart bar shoe;

FIG. 6 is a top plan of the heart bar complementary piece in FIG. 5;

FIG. 7 is a side view taken along lines 7—7 of FIG. 6 with the outline of the stock shoe structure in dotted lines;

Figure 8:
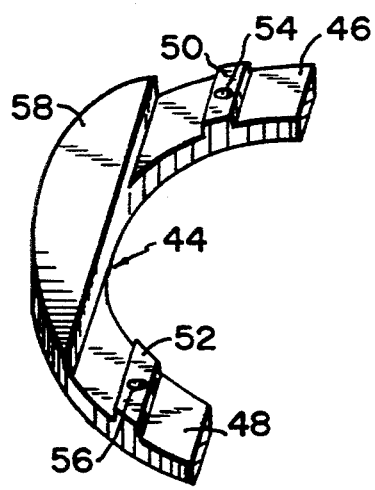
Figure 8A:
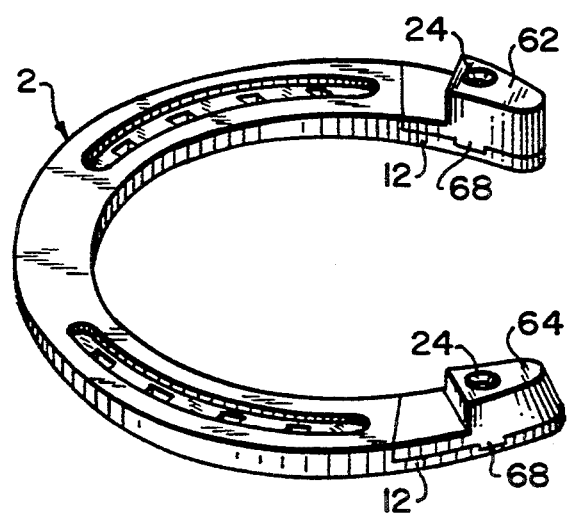
Figure 9:
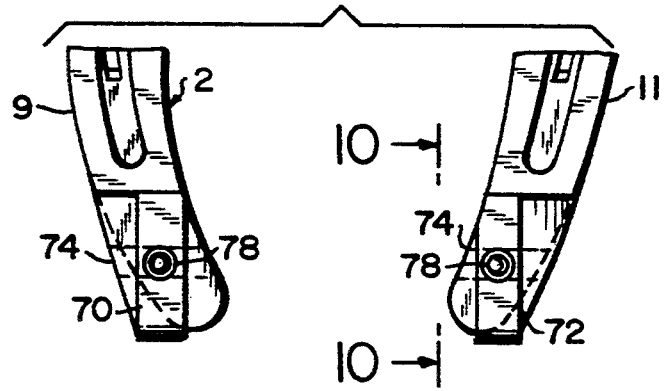
Figure 10:
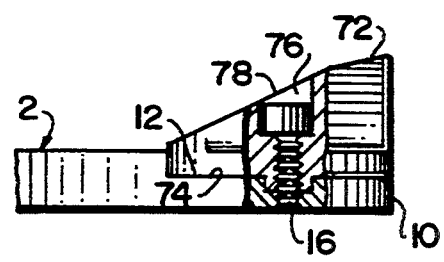
Figure 11:
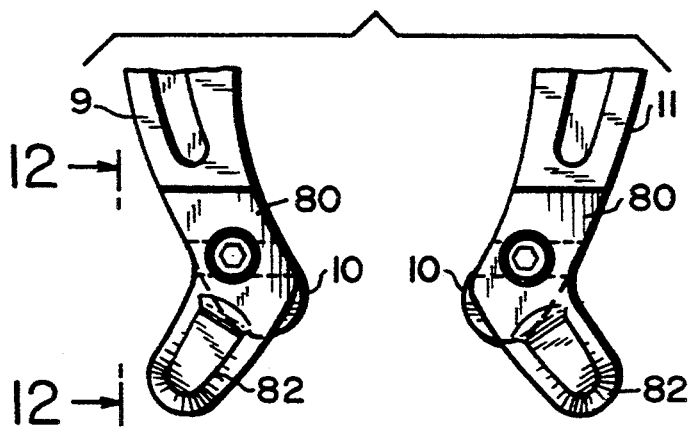
Figure 12:
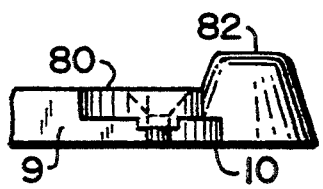
Figure 13:
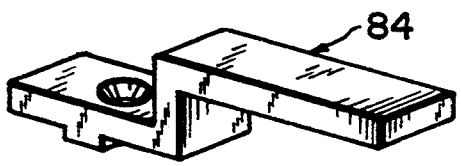
Figure 14:
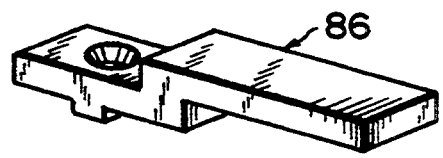

FIG, 8 is a perspective view of the complementary piece utilized to form an egg bar shoe;

FIG. 8A is a perspective view of a pair of plain heel calk complementary pieces;

FIG. 9 is partial bottom plan view of the universal shoe structure with complementary diamond heel calk pieces;

FIG. 10 is a view partly in section along lines 10—10 of FIG. 9;

FIG. 11 is a partial bottom plan view of the universal shoe structure with complementary trailers with calk pieces;

FIG. 12 is a view taken along lines 12—12 of FIG. 11;

FIG. 13 is a perspective view of medium height bow tendon heel extension complementary piece; and FIG. 14 is a perspective view of a low height bow tendon heel extension complementary piece,

BRIEF DESCRIPTION OF ILLUSTRATED EMBODIMENTS

In the accompanying drawings, the stock horseshoe structure of the present invention is indicated generally by the numeral 2. The lower or ground face is indicated at 4. Formed in the ground face 4 is fullering 6 having nail holes 8 through the shoe 2 as indicated. The heel ends 10 of each branch 9 and 11 of the shoe 2 have a recess 12 of generally rectangular section which is approximately 40 to 60% of the thickness of the shoe 2 in depth. A transverse rectangular cross sectional groove 14 is formed in the face 7 of recess 12 perpendicular to the longitudinal axis of the shoe 2 and has a threaded aperture 16 in the base thereof.

Figure 1:
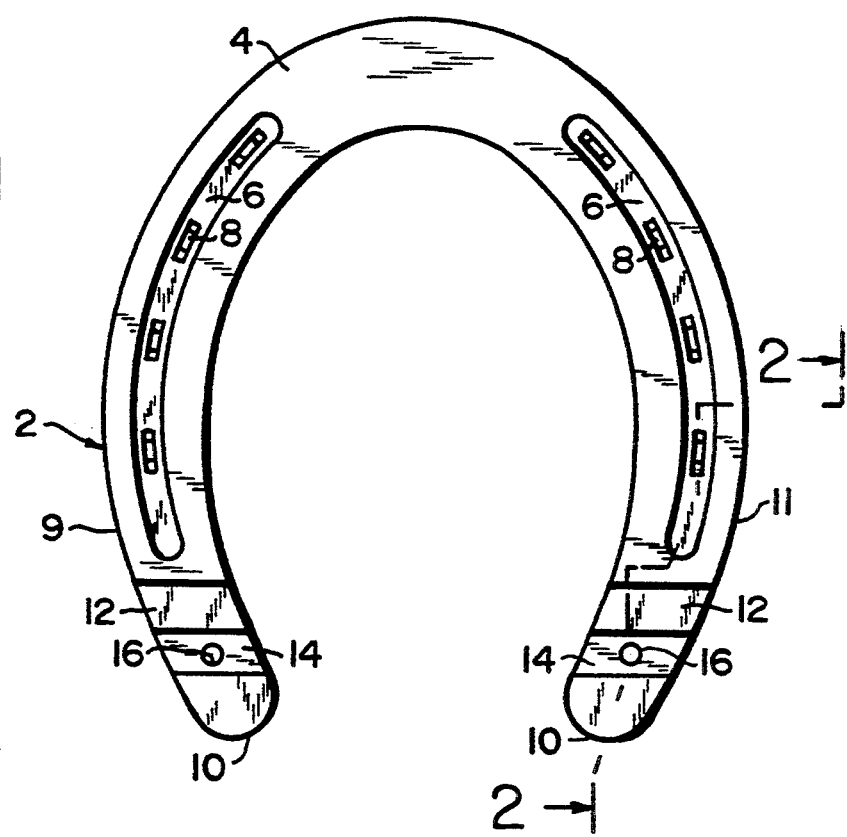
FIG. 1 is a plan bottom view of the stock shoe structure according to the present invention showing the ground contacting surface of the shoe.
Figure 2:
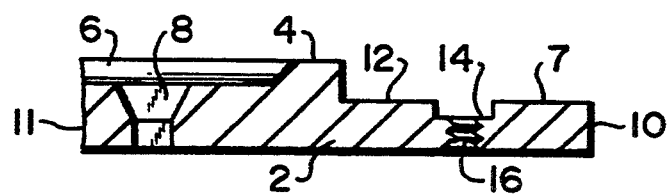
FIG. 2 is a transverse sectional view taken along lines 2—2 of FIG. 1.
Figure 3:
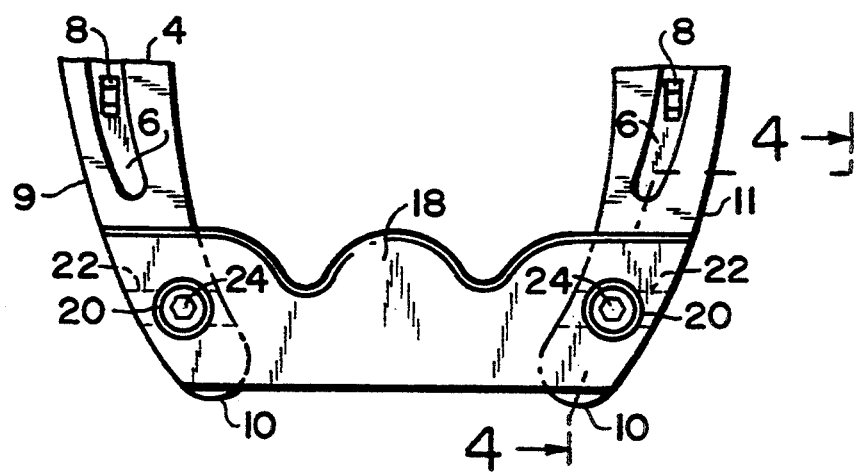
FIG. 3 is a partial bottom plan view of the universal shoe structure of FIG. 1 with a complementary bar in place to form a bar shoe.

In FIGS. 3 and 4, a complementary bar piece 18 having threaded openings 19 with countersink 20 is shown the thickness of the bar 18 is approximately the same as the depth of the recesses 12 formed in each of the heels 10 of branches 9 and 11 of the shoe structure 2. The transverse lugs 22 are dimensioned to fit snugly into the grooves 14 in each recess 12. Allen screws 24 are threaded into apertures 19 at each end of the bar 18 and into threaded apertures 16 of the heels 10 thus together with the congruence of the grooves 14 and lugs 22 holding the bar 18 firmly in place. The resulting structure which is readily and quickly constructed is a bar horseshoe.

If desired, a plain shoe may be obtained by providing complementary pieces with the same top and bottom surface shapes as the recesses 12 and the same height as the depth of the recesses 12.

Additional variations in embodiments of the present invention are shown in the other figures of the drawing.

The construction of a heart bar shoe according to the present invention is illustrated in FIGS. 5–7. The bottom surface of a complementary heart bar piece 26 is seen in FIG. 5 with the stock shoe structure 2 indicated by dotted lines. The heart bar piece 26 comprises the transverse bar body 28 having transverse lugs 30 and 32 at each end thereof with threaded apertures 34 and 36 therethrough. The apertures 34 and 36 are countersunk as indicated at 38. Allen screws 24 secure the heart bar piece 26 to the above structure 2.

The thickness of the bar 26 as indicated at 40 is substantially the same as the depth of the recess 12 in the heel 10 of the shoe structure 2. The tongue portion 42 of the bar 26 is inclined upwardly as shown in FIG. 7.

In FIG. 8, a complementary egg bar piece 44 is shown having arms 46 and 48 with lugs 50 and 52, apertures 54 and 56 and heel section 58. The arms 46 and 48 are secured in the recess 12 of the shoe structure 2 and the piece 44 and shoe structure 2 form the egg bar shoe. In this case, arms 46 and 48 are the same thickness as the depth of the recess 12 and the heel 58 portion is the same thickness as the shoe structure 2.

FIG. 8A shows a perspective view of a pair of regular heel calks 62 and 64 which fit congruently into the recesses 12. Each calk 62 and 64 has a lug 68 and countersunk aperture for receiving the fastener 24 as in the foregoing embodiments.

A diamond heel calk shoe is illustrated in FIGS. 9 and 10. The diamond heel calks are indicated at 70 and 72. The base 74 is formed to fit into the recesses 12 of the heels 10 of branches 9 and 11. A countersunk threaded aperture 76 is formed in the inclined face 78 thereof to receive an Allen bolt 24 which is threaded through the diamond heel calk complementary pieces 70 and 72 and into the threaded apertures 16 of the heel section 10.

FIGS. 11 and 12 show utilization of complementary pieces to form trailers 80 with heel calks FIGS. 13 and 14 respectively illustrate medium height and a lower height bowed tendon bars as complementary pieces 84 and 86 respectively.

It is apparent that the elegance and simplicity of the universal shoe structure and complementary pieces of the present invention provides an extensive range of shoe structures that can be rapidly constructed form one base shoe structure by adding complementary pieces to form the final shoe structure.

It is seen that the present invention greatly cuts inventory costs, space required for inventory and the cost of transportation. It also provides a means for providing a wide variety of shoe structures utilizing cold shoeing practice and not requiring highly skilled forging personnel. Thus, any one person who can shape a shoe, can now provide previously difficult to form complex structures rapidly and with lesser skills required by the farrier utilizing the techniques practiced in the present invention. This will greatly increase the prestige of the farriers in that they find it very easy to handle previously difficult shoeing situations. Although the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed:

1. A horseshoe adaptable to multiple modifications, said horseshoe comprising a horseshoe: stock piece having a conventional top hoof surface, a bottom ground surface and inner and outer faces, fullering in the ground surface of said horseshoe stock piece, nail holes through said piece within the fullering, the heel end of each arm of said shoe piece having a generally flat rectangular recess formed in the ground surface thereof, said recess being from 40% to 60% the thickness of said shoe deep, a transverse groove perpendicular to the longitudinal axis of the horseshoe piece in the central portion of said recess, said groove having walls generally perpendicular to the surface of said recess, an aperture in the base of said groove, said recess, groove and aperture receiving a complementary piece having a transverse lug on one side thereof, and an aperture therethrough, and said complementary piece being secured in said recess by said transverse lug fitting in said groove and a fastener through said apertures, said complementary piece when secured to said stock shoe completing a desired horseshoe structure.

2. A horseshoe as claimed in claim 1 whereas said fastener is a threaded fastener and comprises an Allen fastener, and said apertures are threaded.

3. A horseshoe is claimed in claim 1 wherein said complementary piece comprises a flat plate corresponding in depth, width and length to said recess whereby when it is secured to said stock piece it forms a completed flat horseshoe.

4. A horseshoe as claimed in claim 1 wherein complementary pieces are shaped to provide a horseshoe with heel calks when the said complementary pieces are secured to said stock horseshoe piece.

5. A horseshoe as claimed in claim 1 wherein said complementary piece comprises a central piece with complementary shapes on each lateral side thereof so that when secured on to said stock shoe it forms a heart bar shoe.

6. A horseshoe as claimed in claim 1 wherein said complementary piece comprises a central piece with complementary pieces on each lateral side thereof so that when mounted on a stock shoe it forms an egg bar shoe.

* * * * *